United States Patent [19]

Wolters, Jr. et al.

[11] Patent Number: 5,272,736
[45] Date of Patent: Dec. 21, 1993

[54] CORE LOADING STRATEGY FOR RELOAD OF A PLURALITY OF DIFFERENT FUEL BUNDLE FUEL DESIGNS

[75] Inventors: Richard A. Wolters, Jr., San Jose; Roland O. Jackson, Campbell, both of Calif.

[73] Assignee: General Electric Company, San Jose, Calif.

[21] Appl. No.: 971,643

[22] Filed: Nov. 5, 1992

[51] Int. Cl.$^5$ ................................ G21C 7/00
[52] U.S. Cl. ................................ 376/267
[58] Field of Search .............. 376/267, 349, 435

[56] References Cited

U.S. PATENT DOCUMENTS

| | | | |
|---|---|---|---|
| 4,292,128 | 9/1981 | Takeda et al. | 376/267 |
| 5,017,332 | 5/1991 | Dix et al. | 376/435 |
| 5,089,210 | 2/1992 | Reese et al. | 376/267 |
| 5,171,522 | 12/1992 | Fennern | 376/444 |

*Primary Examiner*—Daniel D. Wasil
*Attorney, Agent, or Firm*—J. S. Beulick

[57] ABSTRACT

In combination with a boiling water nuclear reactor core undergoing a reload, an improved core reload and process of reloading is disclosed. The core reload consists of fuel bundles having differing design margins to critical power and linear heat generation rate. Specifically, a first part of the core reload is selected from fuel bundles having relatively high critical power margin and relatively lower linear heat generation margin. A second part of the core reload is selected from fuel bundles having relatively high linear heat generation margin and relatively low critical power margin. Distribution of the reload fuel bundles throughout the reactor core occurs as a function of critical power margin and linear heat generation rate margin. Specifically, fuel bundles having the high critical power margin are placed in selected intervals to the central portion of the cylindrical core. Fuel bundles having high linear heat generation margin are placed in the peripheral region of the core. Preferably and on a diameter basis, the middle third of the core is interspersed with fuel bundle loading including the high critical power margin fuel bundles. The outer third of the core is interspersed with fuel bundle loading including the high linear heat generation rate margin. There results an overall core loading having overall power exceeding that power attainable by the prior art practice of utilizing one margin design uniformly distributed throughout the core.

10 Claims, 3 Drawing Sheets

CORE LOADING STRATEGY FOR RELOAD OF A PLURALITY OF DIFFERENT FUEL BUNDLE FUEL DESIGNS

This invention relates to designs of core reloads for boiling water nuclear reactors. Specifically, a core reload and process of core reload is disclosed in which fuel bundles of favorable critical power margin are grouped and installed in a first part of a reactor core. Fuel bundles of favorable linear heat generation rate margin are grouped and installed in another portion of a reactor core as part of the same fuel bundle reload. The combination yields increased overall core power output.

BACKGROUND OF THE INVENTION

Boiling water nuclear reactors are known. Typically these reactors include a re-loadable cores including side-by-side fuel bundles. It is constructive in understanding the present invention to first summarize the construction of the fuel bundles, second to discuss how the fuel bundles operate within a reactor core, and finally to understand how reactors have in the past been reloaded.

Fuel bundles in a boiling water reactor contain sealed fuel rods having pellets of nuclear fuel in their interior. Groups of these fuel rods are combined to include a unitary assembly of upstanding fuel rods known as a fuel bundle.

Such fuel bundles include a lower tie plate supporting the group of fuel rods. This lower tie plate admits a flow of water coolant into the fuel bundle for the generation of steam. At least some of the fuel rods extend to and usually fasten to an upper tie plate, this upper tie plate permitting the exit of water coolant and generated steam. A fuel bundle channel extends around the tie plates and the fuel rods in between. This channel restricts the flow of coolant between the tie plates to isolate the steam and water flow path interior of a fuel bundle from all other fuel bundles and the immediately surrounding core bypass zone containing water moderator for neutron moderation. The fuel rods within the fuel bundle are flexible and if not constrained would move out of position and even come into abrading contact; consequently, so-called fuel bundle spacers are placed at spaced elevations in the fuel bundle to maintain the fuel rods in their designed side-by-side relation.

Fuel bundles are placed interior of a boiling water nuclear reactor in a cylindrical central grouping or reactor "core." This core contains many (300 to 1000) side-by-side standing fuel bundles. Water coolant is admitted to the fuel bundles through the lower tie plate from a lower plenum, heated to generate steam in passing through the fuel bundles as the fuel bundles undergo nuclear reaction, and discharged through the upper tie plate to an upper plenum where the generated steam is processed for the extraction of energy from the generated steam.

The reactivity of fuel bundles is typically controlled in so-called "cells", clusters of four fuel bundles, these elongated bundles being separated by a similarly elongated cruciform spatial interval. This elongated cruciform spatial interval is defined exterior of the channels of the fuel bundles. During operation of the reactor, this elongated cruciform section is flooded with water that assists in the moderation of the neutrons for continuing the nuclear reactor. When it is desired to either locally control or "shape" the nuclear reactor, or to shut down the nuclear reaction altogether, elongated cruciform control rods penetrate into and occupy the similarly elongated cruciform sectioned spatial intervals within each control cell. Control of the nuclear reaction results from this penetration.

The control rods when inserted absorb neutrons. For shaping of the reaction, the absorption locally moderates the nuclear reaction. For shutting down the reaction, the control rods absorb sufficient neutrons to cause the reactor to be subcritical; the neutrons emitted and moderated are insufficient to support a continuing reaction.

The refueling of such reactors can be summarized. Typically, the nuclear reactor undergo "outages", periods of time when the reactors are usually disassembled for replacement and relocation of fuel bundles within the reactor core. Typically, with each reactor outage, about ⅓ to 1/5 of the fuel bundles are replaced with new fuel bundles and the used expended fuel bundles discarded. Further, and usually as a function of in-service life, fuel bundles are relocated within the reactor on the basis of age.

A typical fuel bundle relocation occurs with respect to age or relative in-service life of the fuel bundles. Placement of new replacement fuel bundles has heretofore been restricted to a uniform distribution of a fuel bundle design or designs across the reactor core without regard to the design margins of the fuel bundles. Typically, the placement of the new and unused fuel bundles occurs to regions of the reactor core where the dynamics of the newly placed fuel essentially drives and shapes the desired overall power desired uniformly across the core in the fuel design; middle service life fuel bundles are evenly distributed throughout the core in balanced relationship to the newly added fuel; older and almost completely used fuel bundles are placed in a ring surrounding the periphery of the core for maintaining among other things neutron leakage from the core to a minimum. Thus one of the parameters or "degrees of freedom" that has been utilized in distributing fuel bundles in the past to a configuration within the reactor core has been the relative in-service life of the fuel bundles.

It has been known to accommodate in nuclear reactor cores at differing core locations, fuel bundles having contained fuel rods with different fuel pellet designs of differing reactivities. An example of a fuel bundle and fuel pellet design that incorporates differing reactivities is the addition of gadolinium to the fuel pellets within a fuel bundle for so-called "power shaping" of the fuel bundle during its operational life. Such power shaping can be best understood by first setting forth the general neutron density characteristics of a boiling water nuclear reactor and secondly setting forth how "power shaped" fuel bundles are distributed to specific locations within a boiling water nuclear reactor core.

The fuel bundles within a boiling water nuclear reactor include a lower "single phase" region and an upper "two phase" region. Simply stated, when water enters the lower part of a fuel bundle, no steam is present. As the water rises within the fuel bundle, increasing fractions of the upwardly rising fluid become steam. Hence, the upper two phase region of the fuel bundle is said to include an increasingly higher void fraction as the water proceeds from the bottom of the fuel bundle to the top of the fuel bundle.

This void fraction characteristic is not only common to the individual fuel bundles within a reactor core but common to the entire core as well. Simply stated, the bottom of the entire core has a relatively high density of water moderator; the top of the entire core has a relatively low density of water moderator (with a higher "void fraction" of steam).

These differing densities of water in the reactor core directly effect the nuclear "neutron" densities within a boiling water nuclear reactor core. The reader will remember that the main atomic reaction in a boiling water nuclear reactor generates high speed neutrons. These high speed neutrons must be moderated to low speed or "thermal" neutrons to continue the reaction. The water "moderator" within the reactor accomplishes this function.

Specifically, the water dense bottom of nuclear reactor cores tend to have areas of high thermal neutron densities extending outwardly to the periphery of the core. The top of nuclear reactor cores having a high water void fraction tend to have areas of lower neutron densities at the top of the core—especially in the peripheral regions of the core. Since the thermal neutron densities are directly related to the power outputs of nuclear fuel rods within the fuel bundles, it will be appreciated that this variability of neutron density has been directly related to the way in which a core is loaded with so-called "power shaped" fuel.

This described (and oversimplified) neutron density is complicated by another factor. This factor is the so-called "hot to cold reactivity swing." A brief summary of this problem will suffice for the purposes of this disclosure.

Reactors are most difficult to shut down from the nuclear reaction standpoint when the reactors are in the "cold" state and just starting up. In this cold state, the reactors have a high water content (there is little or no steam). Realizing this, it is a common regulatory requirement that the reactors be capable of being shut down in the cold state with that control rod having the highest efficiency or "worth" inoperative and not inserted to the core.

Understanding this much, it will be noted that hot reactivity is a more or less uniform phenomena throughout the reactor core. Cold reactivity, however, is a different matter. While cold reactivity in the general case is a uniform phenomena throughout the reactor, the withdrawal of the most critical control rod makes the cold reactivity measurement a matter of local concern.

Modern regulatory—and safe—nuclear practice requires that the ability to shut down the reactor in the difficult to shut down "cold" state be analyzed—at least on a theoretical basis. Further, and for the modeling of this capability, it is presumed that the particular control rod having the greatest moderating effect on the reaction is inoperative. With such a constraint, it must be shown analytically that any fuel loading design can be shut down in the cold state with a margin of at least one percent from the critical state.

This being the case, the reader will understand that cold reactivity is a decidedly local state. It depends not only on the core wide cold reactivity, but also on the local reactivity in the vicinity of that control rod having the most critical effect on shutting down the nuclear reaction in the cold state. It will further be understood, that these hot to cold reactivity swings constitute another of the complicated neutron density interactions necessary in modern boiling water nuclear reactor core design.

To accommodate these variations in neutron density, certain fuel bundle designs have been "power shaped" utilizing the burnable neutron absorber gadolinium within the fuel pellets. Specifically, and as to new fuel bundles placed within the outer ⅓ diameter of a reactor core, there is a tendency of the fuel rods contained in the lower region of the fuel bundle to have a higher linear heat generation rate than the same fuel rods in the upper two phase region of the fuel bundle. This difference in neutron density has been "shaped" by the placement of gadolinium typically in the lower regions of such fuel bundles. During the first (and part of the second) cycle of reactor life, the gadolinium absorbs the neutron surplus in the lower single phase region of such fuel bundles and prevents the linear heat generation rates of such fuel bundles from being exceeded.

It is to be understood that the absorption of neutrons in a boiling water nuclear reactor is never completely beneficial; such absorption of neutrons which do not contribute to the "chain reaction" always represents an inefficiency in the desired nuclear reaction. However, as to such fuel bundles in the early portion of their in-service lives, the benefits of preventing excessive linear heat generation rates far outweigh the detriment of neutron absorption. Unfortunately, and during the remainder of the fuel bundle life cycle, the remaining burned gadolinium neutron absorber continues to absorb neutrons at a reduced rate—essentially being completely parasitic and detrimental to the nuclear reaction.

There is an additional difficulty with such gadolinium "power shaped" designs. Specifically, the amount of the added gadolinium must be founded on a design prediction of the local power of the core as the core is configured after the reload. Thus a fuel designer first predicts this overall power and thereafter specifies the amount and location of gadolinium that must be added to the fuel bundle to achieve a theoretical efficiency. By way of example, if a 10% improvement of linear heat generation rate is desired, sufficient gadolinium is added to the fuel bundle to achieve this result.

Unfortunately, such design predictions are rarely exactly on target. Furthermore, and to complicate the process of design prediction, it will be remembered that the gadolinium —functioning as a neutron absorber— not only effects the neutron density locally within the bundle to which the gadolinium is added but also the locally surrounding fuel bundles—many of which are well into their in-service life. It will be appreciated that the process of predicting the performance of such fuel is complicated. By way of furthering the example give above, if a 10% improvement in linear heat generation rate was predicted and sufficient gadolinium added to achieve this result, the actual required gadolinium may have been different. For example, only an 8% margin may have been required; alternately, it may be found that a 12% margin was needed. In either case, the gadolinium design will be less than optimum representing a further inefficiency in the fuel cycle.

SUMMARY OF THE PRIOR ART

Fuel bundle dimension is for the most part fixed with the original reactor design. Consequently, most fuel bundles are on the order of 160 inches in length and have a cross sectional dimension in the order of 6 inches by 6 inches. Accordingly, modern fuel bundle design has included changing the interior contents of such fuel bundles; the overall dimensions remain for the most part unchanged. Changes in the interior fuel bundle design have included changing the density of the fuel rod array, length of the fuel rods, and the spacer design within the fuel bundles. An example of two different types of designs having two different types of design limits can be constructive and are relevant to the fuel bundle core placement of this invention.

In the following section, the design limitations of critical power and linear heat generation rate will be serially discussed. These with design limitation will only be summarized here. The complexities of a full understanding of such design limitations will be left to those having skill in the art. Thereafter, two specific examples of fuel bundle designs having varying tolerance to these design limitations will be set forth.

Some explanation of critical power can be offered.

Fuel rods interior of nuclear fuel bundles are preferably continuously coated with liquid water vapor. This liquid water vapor coating is turned into steam on a constant basis and replenished by the passing water steam coolant stream on a constant basis. Consequently, this coating of water enables the cladding of the fuel rods within a boiling water reactor to maintain a constant temperature.

Where the power output of the fuel rod becomes too high, this coating of water coolant is interrupted by the so-call "boiling transition" process. The water coating on the exterior of the cladding of the fuel rod is locally interrupted and disappears. The cladding in the area of the interruption rapidly overheats, adversely changes its fuel containment properties and can be in danger of becoming locally ruptured. Such a fuel rod is said to have exceeded its "critical power."

The so-called "critical power ratio" is the ratio of that power theoretically necessary to cause the fuel rod to operate at critical power compared to (that is divided by) the current power level of the fuel rod. The higher the critical power ratio the more margin that there is to the critical power limit. The lower the critical power ratio is, the closer the margin of operating state is to the theoretical critical power limit. Therefore, a (minimum) critical power of one (1) would conform to a (theoretical) burn out event. There would be no "margin" to the critical power.

The reader will understand that "critical power" is utilized as a useful design limitation. Design is made around this critical power standard with usual allowances of about 0.07 of the ratio being allowed for errors of rod operating condition measurement and about 0.14 being allowed for anticipated transients (normally anticipated but unfavorable changes in reactor operating state) likely to be encountered over the reactor lifetime.

Another type of fuel bundle design limitation is linear heat generation rate. Fuel rods putting out excessive amounts of power per unit length can exceed what is known as a linear heat generation rate. When the linear heat generation rate is exceeded along a segment of a fuel rod, the fuel and gas within the rod generate excessive pressure while the cladding about the fuel rod deteriorates due to excessive heat. Thus, linear heat generation rate—and a comparable bundle wide function known as minimum planar allowable heat generation rate—are used as design criteria. Similar to critical power, linear heat generation rate and minimum planar allowable heat generation rate are used as design limits with certain tolerances added.

One type of known fuel bundle has particularly good resistance to the minimum critical power ratio limitation. Specifically, such a fuel reload is sold under the trade designation GE 9 and GE 10 by the General Electric Company through offices in San Jose, Calif. The fuel bundle includes a matrix of sixty full length fuel rods having an 8 by 8 density with the four central fuel rods in the matrix displaced by a large central water rod. The improved critical power of this fuel bundle is due in part to a ferrule spacer. This ferrule spacer acts in the upper two phase region of the fuel bundle to preserve the coating of water about the fuel rods and impede the onset of transition boiling.

Unfortunately, this same fuel bundle design has a lesser margin to linear heat generation rate. Accordingly, it can be said to be primarily limited by its linear heat generation rate margin.

Another type of known fuel bundle has particularly good resistance to minimum allowable planar heat generation rate or linear heat generation rate. Fuel bundle designs sold by the General Electric Company under the designation GE 11 have particularly good resistance to this design limitation. Simply stated, such fuel bundles have greater densities of fuel bundles rods—these latter fuel bundle designs having a fuel rod matrix in the order of 9 by 9. This higher density of fuel rods enables these fuel bundle designs to allow more rapid heat transfer from the individual fuel rods to the surrounding coolant. Thus, the fuel rods do not succumb as easily to limitations related to linear heat generation rate or minimum allowable planar heat generation rate.

Further, these fuel bundles also contain so-called part length fuel rods. These part length fuel rods extend from the supporting lower tie plate less than the full distance to the upper tie plate. With this less than full extension, and in the "cold" state of the reactor, the interval above these fuel rods is filled with water. This filling with water increases the hot to cold reactivity swing of such fuel bundles.

Unfortunately, these same fuel bundles have a lesser design margin (allowing for anticipated transients) related to critical power because of the shorter thermal constant associated with smaller rod diameters. Accordingly, the fuel bundles are limited by their critical power margin.

Core reloads have heretofore consisted of reactor owners ordering and distributing throughout the reactor one type of fuel design for a given cycle. The only known exceptions to this practice are the aforementioned gadolinium "power shaping" and the intermittent dispersing of various fuel designs without regard to their margin limitations in order to utilize fuel bundle inventory. It is not known to utilize specific fuel bundle designs in particular core locations where the particularly advantageous limiting margins of the fuel bundles can in sum contribute to improved reactor power output.

SUMMARY OF THE INVENTION

In combination with a boiling water nuclear reactor core undergoing a reload, an improved core reload and process of reloading is disclosed. The core reload consists of a mixture of fuel bundles having differing design margins to critical power and linear heat generation rate. Specifically, a first part of the core reload is selected from fuel bundles having relatively high critical power margin and relatively lower linear heat generation margin. A second part of the core reload is selected from fuel bundles having relatively high linear heat generation margin and relatively low critical power margin. Distribution of the reload fuel bundles throughout the reactor core occurs as a function of critical power margin and linear heat generation rate margin. Specifically, fuel bundles having the high critical power margin are placed in selected intervals to the central portion of the cylindrical core. Fuel bundles having high linear heat generation margin are placed in the peripheral region of the core. There results an overall core loading having overall power exceeding that power attainable by the prior art practice of utilizing one margin design uniformly distributed throughout the core.

A serendipitous advantage of the disclosed fuel bundle design is present. Fuel bundle distribution is not predicated on anticipated fuel bundle output design local to the region in which the fuel bundle is placed. Rather, the fuel bundles with advantageous critical power margin and linear heat generation rate margin are added to the core irrespective of the predicted characteristics of their local fuel bundle neighbors. Thus, the design margin of the fuel bundles is fully realized and not dependent upon predicted performance of either the new fuel bundles or the surrounding fuel bundle neighbors.

An addition element of serendipity is present in the GE 11 design. Specifically, these fuel bundles not only contain a relatively dense 9 by 9 array of fuel rods but also part length fuel rods. These part length fuel rods are known to have improved hot to cold reactivity swing. Further, and coincident with most core geometries, it happens that the most critical control rods utilized in the shut down of the nuclear reaction are approximately two-thirds of the radius from the center of the cylindrical core to the periphery. In other words, placement of the denser 9 by 9 array with the part length rods in the preferred embodiment of this invention coincides with the need to improve the hot to cold reactivity swing in this region. As a consequence, gadolinium either need not be used at all in the fuel design or can be used in a more limited quantity to obtain a more efficient nuclear reaction.

DESCRIPTION OF THE PREFERRED EMBODIMENT

Figure 1:
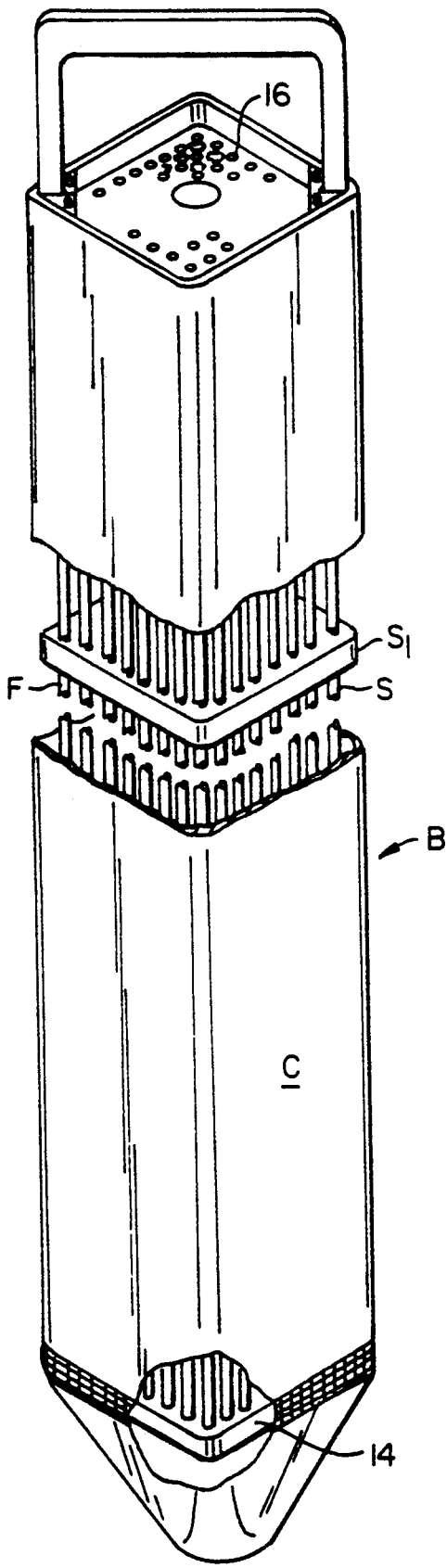
FIG. 1 is a prior art perspective view of a fuel bundle showing the lower tie plate, upper tie plate, a typical spacer and the surrounding channel, the bundle here being included only for general illustrative purposes.

Referring to FIG. 1, a typical fuel bundle construction is illustrated. Since the construction there shown in vertically truncated, it is important for the reader to keep in mind the general dimensions of the fuel bundle. Typically the fuel bundle is in the order of 160 inches in length and has a square cross section in the order of 6 inches by 6 inches.

The illustrated fuel bundle of FIG. 1 is broken away to disclose a lower tie plate 14, upper tie plate 17 and plurality of upstanding fuel rods F therebetween. The fuel bundle B is surrounded between the tie plates by a channel C.

In operation, water moderator passes upwardly through lower tie plate 14, passes within channel C and around fuel rods F in a confined fluid flow path. Water passing in this confined fluid flow path generates a fraction of steam on the surface of the fuel rods F, and passes out through the upper tie plate 16 for further processing including the generation of energy. For the illustrative purposes of the flow path here illustrated, only one spacer S1—the upper most spacer—is illustrated. The reader will understand that between 5 to 9 and usually 7 evenly vertically spaced spacer S are utilized to maintain the otherwise flexible individual fuel rods in their designed side-by-side relation.

Figure 2A:
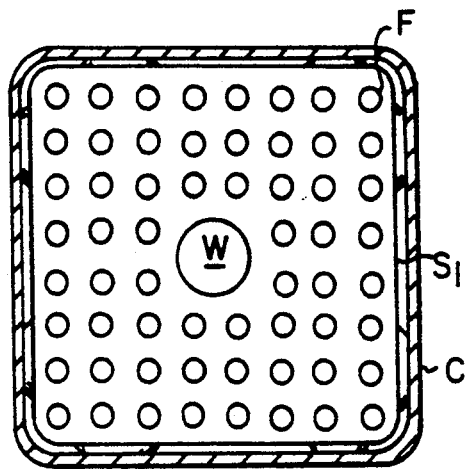
FIG. 2A is a cross section of a fuel bundle of the prior art including an 8 by 8 matrix of fuel rods with the four central fuel rods displaced by a large central water rod, this illustrated fuel bundle having a relatively high critical power margin and a relatively lower linear heat generation rate margin.

Referring to FIG. 2A, the cross section of a fuel bundle of the GE 9 or 10 variety is illustrated. This cross section is taken in the vicinity of spacer S1. It includes fuel rods F arrayed in a 8 by 8 matrix with the four central fuel rods displaced from the array by a single, central large water rod W. Spacer S is of the ferrule type, and a small portion of the ferrules are shown in the detail of FIG. 2B.

Figure 2B:
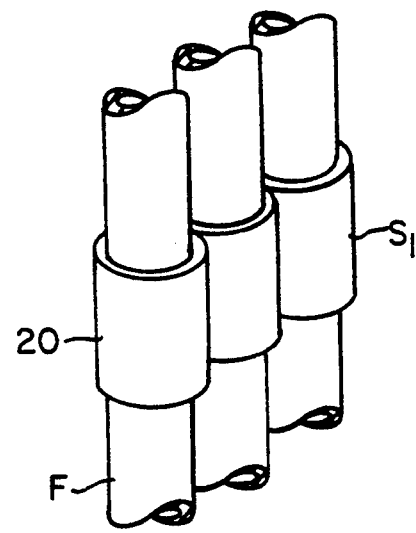
FIG. 2B is a perspective of several fuel rods at a ferrule spacer in the upper two phase region of a fuel bundle illustrating schematically the passage of the rising steam water mixture through the ferrules for the preservation of the steam water mixture about the fuel rods for the improvement of critical power.

Referring to FIG. 2B, it can be seen that each of the ferrules 20 of spacer S1 individually surround fuel rods F. It has been found that the steam water mixture flowing through such ferrule spacers tend to classify the flow at the fuel rod F in the region immediately above (or downstream from) the spacer. Specifically, the necessary water coating required for the prevention of critical power limitations is enhanced in this downstream region after the steam water mixture passes upwardly through the spacer S1. This effect is most predominate in the upper two phase region of the reactor—particularly at the second and third spacers (that is spacers S2 and S3—not shown).

Figure 3A:
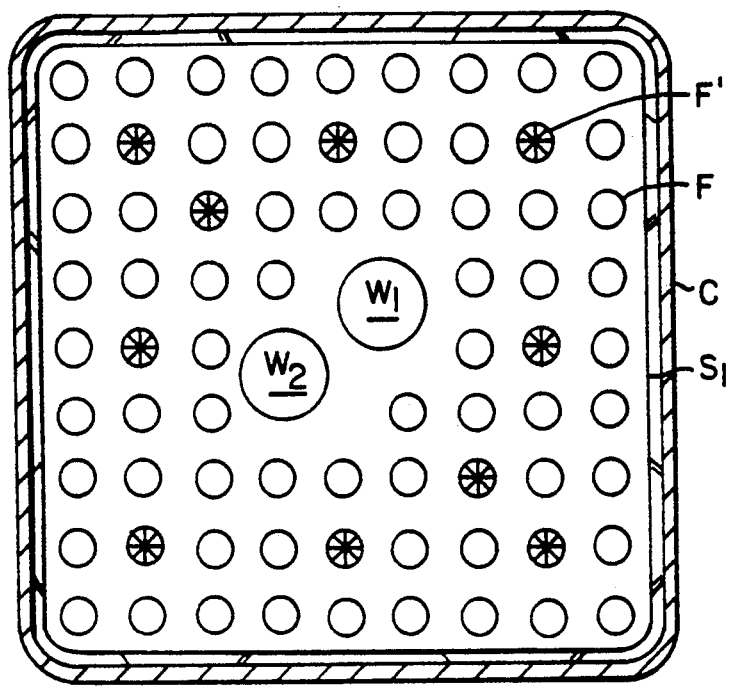
FIG. 3A is a cross section of a fuel bundle of the prior art including a 9 by 9 matrix of fuel rods with a central portion of the fuel bundle matrix being displaced by two water rods, this illustrated fuel bundle having relatively high linear heat generation rate margin and relatively lower critical power margin.

Referring to FIG. 3A, the cross section of a fuel bundle constructed according to the GE 11 construction is illustrated. Specifically, a 9 by 9 array of fuel rods F is disclosed with seven central fuel rods displaced from the center of the array for the placement of two large water rods W1 and W2. The fuel bundles is illustrated in the vicinity of spacer S1 and includes 10 part length fuel rods F'.

Figure 3B:
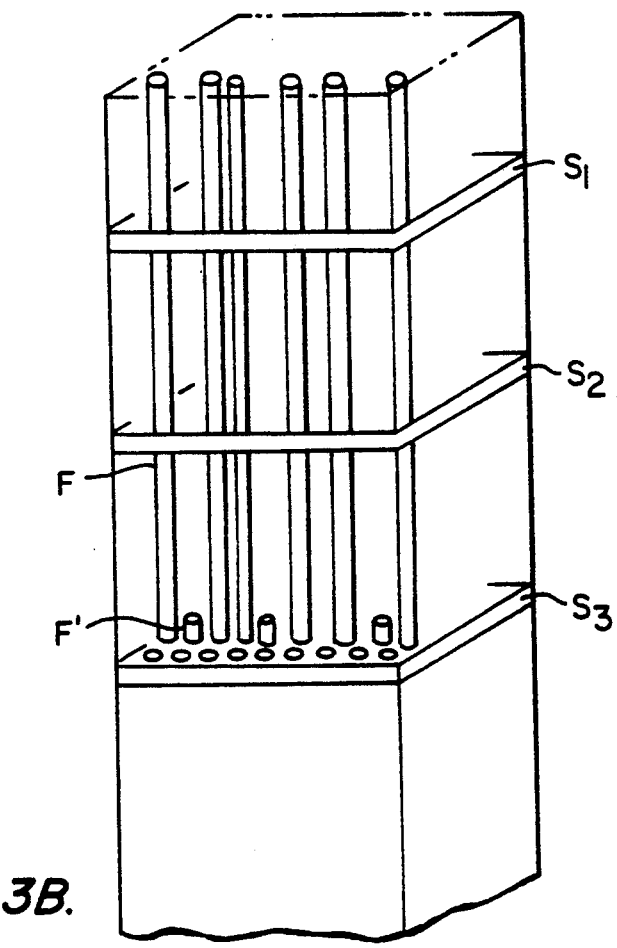
FIG. 3B is a schematic perspective of a fuel bundle containing part length rods in combination with a 9 by 9 array for improvement of the hot to cold reactivity swing in the region of the fuel bundle; and, FIG. 4 is a cross section taken at a reactor core specifying the number of reloaded fuel bundles and illustrating the preferred dispersion of high critical power margin fuel bundles to the central portion of the core and the preferred dispersion of high linear heat generation rate margin fuel bundles to the outer portion of the core to enable the combination of the two margin design of reload to obtain a greater overall reactor power than the distribution of either reload design alone.

Referring simultaneously to both FIGS. 3A and the perspective schematic view of the top portion of a fuel bundle B illustrated in FIG. 3B, the placement of part length fuel rods F' can be understood. Simply stated, part length fuel rods F' are distributed in the fuel bundle at locations where the part length fuel rods are adjoined by full length fuel rods. It is not the purpose of this specification to set forth the complex interactions of the part length fuel rods. Rather, the important point that can be made is that with the addition of the part length fuel rods F' within the 9 by 9 array, a fuel bundle having both improved linear heat generation rate and improved hot to cold reactivity swing is generated.

Having set forth the two types of preferred fuel bundle construction, attention can now be directed to their respective placement within a reactor core.

Figure 4:
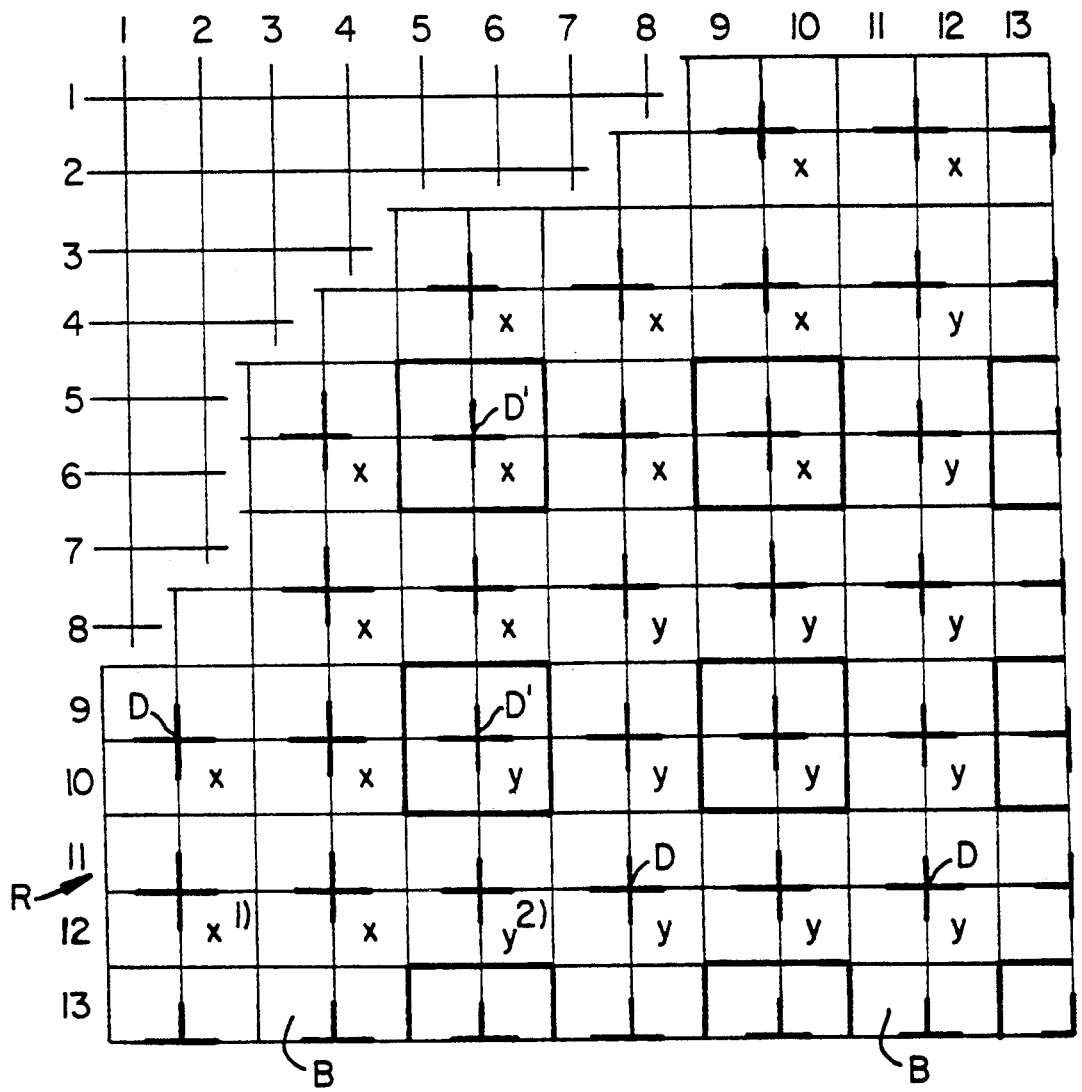

Referring to FIG. 4, one quarter of a typical core is illustrated. The illustrated core R is based in the illustrated quarter section on a 13 by 13 matrix of fuel bundles. It is necessary that the core fit into a substantially circular cross section of a reactor vessel. Consequently, the core must be roughly circular. To this end, certain of the fuel bundles are omitted from this quarter section in the upper right of FIG. 4.

The reader will further understand that the core bypass region is only schematically shown. This is the region which is flooded with water and is penetrated by control rods D.

Further, it will be noted that the array of fuel bundles B is interspersed with control rods D. These respective control rods D each penetrate into the interstitial core bypass region between four respective fuel bundles B. When all control rods D are inserted, the reaction is shut down. Upon control rod withdrawal, reaction begins.

In the illustration, approximately ¼ of the illustrated fuel bundles are marked with either an "X" or a "Y".

Some explanation of the reactor state during a reactor outage and before the replacement of fuel bundles is instructive.

When a reactor undergoes an "outage", old and used fuel bundles are discarded (usually ⅓ to 1/5 of the fuel bundles). Thereafter, those fuel bundles having served at least one fuel cycle but less than all of their respective fuel cycles are shuffled within the reactor dependent (usually) upon in-service life. The state of the reactor is shown after such shuffling—it being presumed that those fuel cycle location marked with either an "X" or a "Y" are empty. As the reader will shortly understand, it is into these two locations that the fuel bundles of FIGS. 2A, 2B (locations "Y") and FIGS. 3A, 3B (locations "X") will be placed.

It is in the interest of reader understanding, that the explanation of core fuel bundle placement be illustrated in the particular sequence described. It will be understood however that only the end placement is required; the actual vagaries of reactor refueling (and repair) may require considerable variation from the sequence herein illustrated.

It will readily be determined in FIG. 4 that 140 fuel bundles are illustrated with 28 fuel bundles being replaced in the illustrated one quarter core section. Therefore, a reactor core R is illustrated which in all quarter sections together would contain 560 fuel bundles with 112 fuel bundles replaced.

Further, the inner portion of the core R is shown with 13 (thirteen) "Y" locations being replaced with fuel bundles B having the configuration of FIGS. 2A and 2B. These 8 by 8 arrays having full length fuel rods total approximately 52 such fuel bundles for the entire core.

Similarly, the outer portion of the core R is shown with 15 (fifteen) "X" locations being replaced with fuel bundles B having the configuration of FIGS. 3A and 3B. These 9 by 9 arrays having part length rods total approximately 60 in number for the entire core.

In terms of general description, it can be seen that the fuel bundles B having relatively high critical power margin and relatively lower linear heat generation rate margin occupy the central portion of the reactor core. Further, fuel bundles B having relatively high linear heat generation rate margin and relatively lower critical power margin occupy the peripheral portion of the reactor core.

As has previously been explained, control rods such as control rods D' can constitute the most critical control rods in the reactor. Consequently, it is preferred that in these locations, fuel bundle having both higher matrix densities and part length fuel rods be utilized.

What is claimed is:

1. A reload of a boiling water nuclear reactor having a cylindrical core with a plurality of vertically upstanding fuel bundles with ⅓ to 1/5 of said bundles for removal from said core and replacement by a corresponding plurality of fuel bundles constituting said reload, said reload comprising in combination:
    a first part of the core reload is selected from fuel bundles having relatively high critical power margin and relatively lower linear heat generation margin;
    a second part of the core reload is selected from fuel bundles having relatively high linear heat generation margin and relatively low critical power margin;
    said first part of said core reload having said fuel bundles having said high critical power margin placed in dispersed intervals to the central portion of the cylindrical core;
    said second part of said core reload having said fuel bundles having said high linear heat generation rate placed in dispersed intervals to a portion of said core around said peripheral portion and nearer the side edge of said core whereby there results an overall core loading having overall power exceeding that power attainable either by utilizing said first fuel bundle group or said second fuel bundle group uniformly distributed through out the core.

2. The core reload of claim 1 and wherein said first part of said core reload includes:
    fuel bundles containing an 8 by 8 matrix of fuel rods with four central fuel rods displaced from said matrix with a large central water rod.

3. The core reload of claim 2 and wherein said first part of said core reload further includes:
    fuel bundles containing ferrule spacers in the upper two phase region of said fuel bundle for improving critical power of said fuel bundles.

4. The core reload of claim 1 and wherein:
    said first core reload contains a matrix of 8 by 8 fuel rods; and,
    said second core reload contains a matrix having a density greater than 8 by 8.

5. The core reload of claim 1 and wherein said second part of said core reload includes:
   fuel bundles containing part length fuel rods.

6. A process for the reload of a boiling water nuclear reactor having a cylindrical core with a plurality of vertically upstanding fuel bundles with ⅛ to 1/5 of said bundles for removal from said core and replacement by a corresponding plurality of fuel bundles constituting said reload, said reload process comprising the steps of:
   removing from said core ⅛ to 1/5 of said fuel bundles from said core;
   repositioning fuel bundles not removed from and remaining within said core to randomly define intervals for receiving said reload uniformly throughout the interior of said core and away from those bundles on the peripheral boundary of said core;
   providing fuel bundles for said reload including a first plurality of fuel bundles having relatively high critical power margin and relatively lower linear heat generation margin and a second plurality of the fuel bundles having relatively high linear heat generation margin and relatively low critical power margin;
   selecting a first part of the core reload from said fuel bundles having relatively high critical power margin and relatively lower linear heat generation margin;
   selecting a second part of the core reload from said fuel bundles having relatively high linear heat generation margin and relatively low critical power margin;
   placing said first part of said core reload to said randomly defined intervals in the central portion of said core whereby said fuel bundles having said high critical power margin placed at dispersed intervals to the central portion of the cylindrical core;
   placing said second part of said core reload to said randomly defined intervals surrounding the central portion of said core whereby said fuel bundles having said high linear heat generation rate are placed in dispersed intervals to a portion of said core around said peripheral portion and nearer the side edge of said core
   whereby there results an overall core loading having overall power exceeding that power attainable either by utilizing said first fuel bundle group or said second fuel bundle group uniformly distributed in said reload through out the core.

7. The core reload process of claim 6 and wherein said providing said first part of said core reload includes:
   providing fuel bundles containing an 8 by 8 matrix of fuel rods with four central fuel rods displaced from said matrix with a large central water rod.

8. The core reload process of claim 7 and wherein said providing said first part of said core reload further includes:
   providing fuel bundles containing ferrule spacers in the upper two phase region of said fuel bundle for improving critical power of said fuel bundles.

9. The core reload process of claim 6 and wherein:
   said provided second core reload contains a matrix of fuel rods having a density greater than 8 by 8.

10. The core reload of claim 6 and wherein said provided second part of said core reload includes:
    providing fuel bundles containing part length fuel rods.

* * * * *